United States Patent

[11] 3,551,766

[72] Inventor Herbert Stemmler
Nussbaumen, Switzerland
[21] Appl. No. 708,370
[22] Filed Feb. 26, 1968
[45] Patented Dec. 29, 1970
[73] Assignee Aktiengesellschaft Brown, Boveri & Cie
Baden, Switzerland
a joint stock company
[32] Priority Mar. 10, 1967
[33] Switzerland
[31] No. 3492/67

[54] REGULATABLE AND CONTROLLABLE INVERTER OR FREQUENCY CHANGER ARRANGEMENT FOR FEEDING AC MOTORS
7 Claims, 9 Drawing Figs.
[52] U.S. Cl. ................................................. 318/179
[51] Int. Cl. ................................................. H02p 5/28
[50] Field of Search ........................................ 318/138,
227, 254, 327, 328, 175, 178, 179

[56] References Cited
UNITED STATES PATENTS

| | | | |
|---|---|---|---|
| 2,876,406 | 3/1959 | Charbonneaux et al. | 318/227 |
| 3,159,777 | 12/1964 | Manteuffel | 318/138 |
| 3,210,631 | 10/1965 | Niccolls | 318/138 |
| 3,254,285 | 5/1966 | Jotten | 318/138 |
| 3,293,520 | 12/1966 | Lehry | 318/227 |

*Primary Examiner*—Oris L. Rader
*Assistant Examiner*—Gene Z. Rubinson
*Attorney*—Pierce, Scheffler and Parker ABSTRACT: A control circuit for operating a multiphase alternating current of the synchronous or asynchronous type from the output of a multiphase inverter includes a scanner which produces for each motor phase a first sinusoidal voltage representative of the instantaneous position of the motor rotor and a second output voltage similar to the first output voltage but phase displaced from the latter by 90°. The voltages produced by the scanner are combined in multipliers with other voltages representative of phase current and other motor characteristics and the output voltages of the multipliers are used to control operation of the inverter.

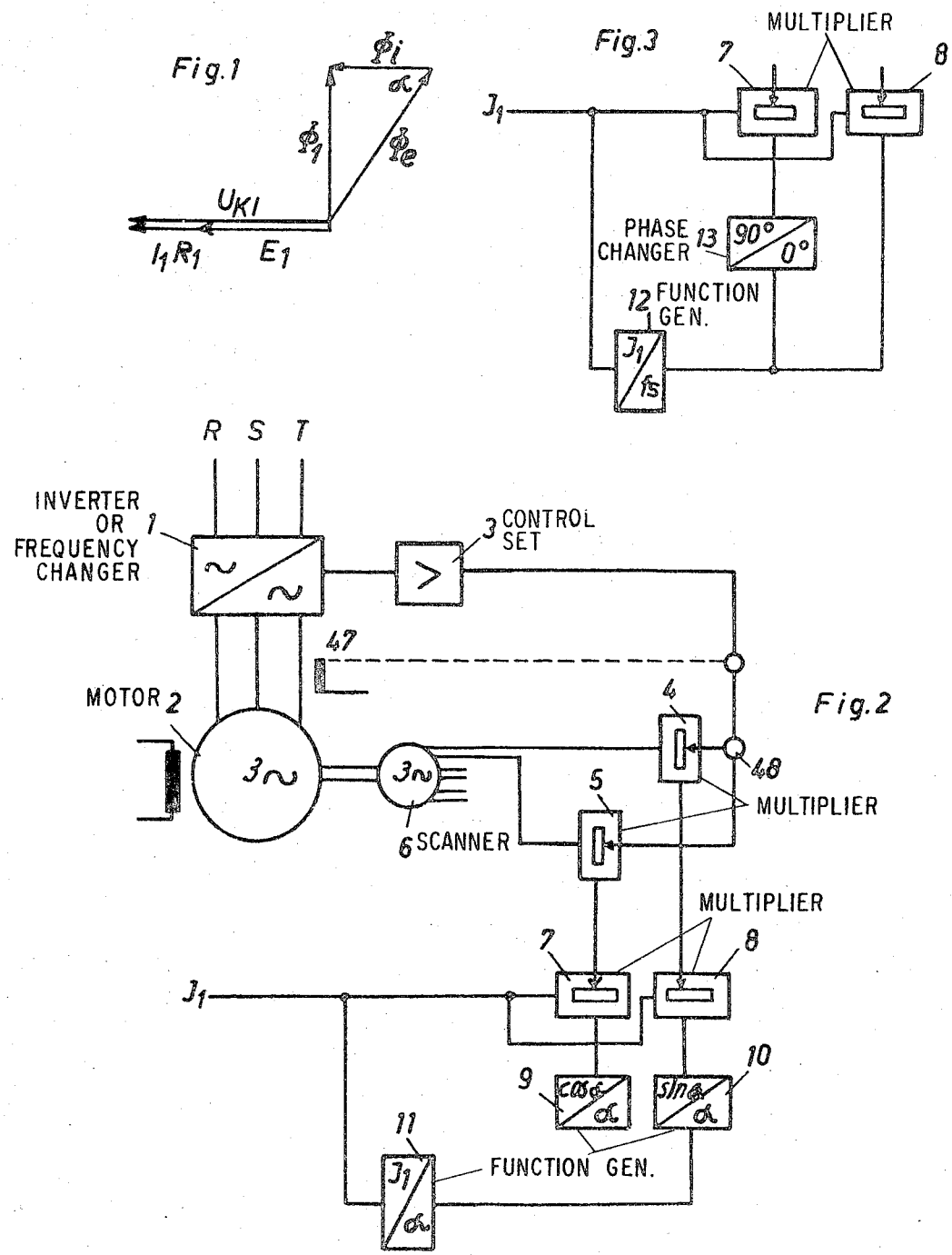

PATENTED DEC 29 1970
3,551,766
SHEET 2 OF 3
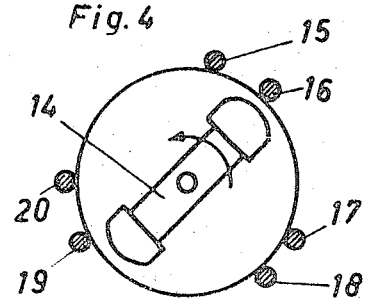
Fig. 4
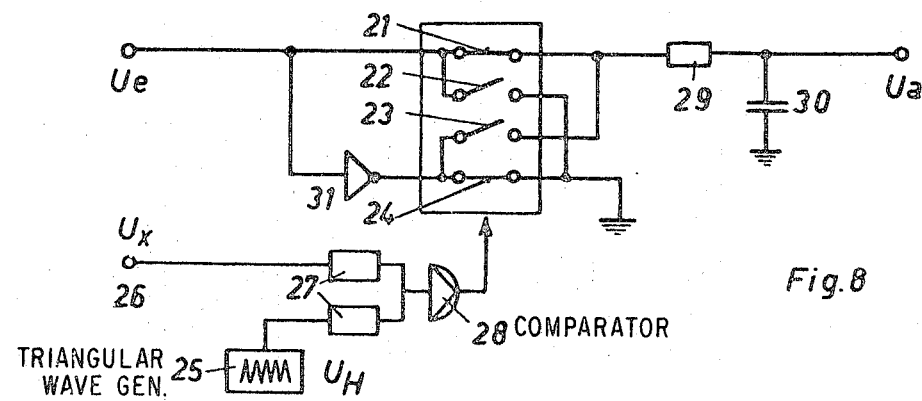
Fig. 8
TRIANGULAR WAVE GEN.
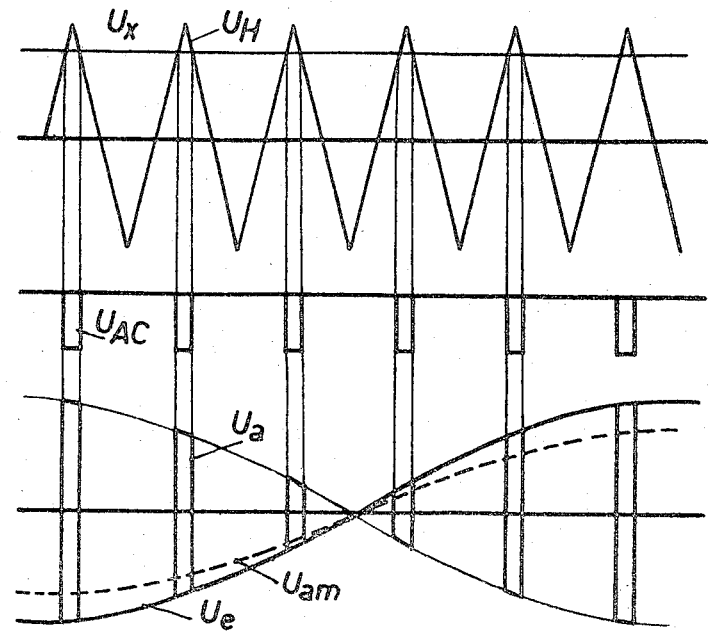
Fig. 9

REGULATABLE AND CONTROLLABLE INVERTER OR FREQUENCY CHANGER ARRANGEMENT FOR FEEDING AC MOTORS

The present invention relates to a regulatable and controllable inverter- or frequency-changer arrangement for feeding AC motors, with regulation and control of the frequency and magnitude of the load current.

The electrical quantities of AC motors fed through inverters or frequency changers are regulated or controlled with the aid of the grid control of the inverter- or frequency-changer arrangement. In such inverters or frequency changers, a sinusoidal control signal produces an output voltage proportional to the control voltage. Thus, the regulation and control necessitates the formation of a usually triphasic sinusoidal reference value, which influences both the amplitude and the frequency of the motor current.

In order to obtain the frequency, tacho-dynamo machines were used, which produce a DC voltage proportional to speed. This voltage can be fed to the control device to produce by electronic means a control voltage with a frequency, which controls or regulates the speed of the motor. However, this conversion cannot reproduce the original frequency with the requisite precision. For this reason, these devices have hitherto not been employed in synchronous machines. However, there arises the demand for providing for synchronous machines as well, a control and regulating system which uses electronic means and makes possible the regulation and control of the frequency and the amplitude in the so-called four-quadrant operation; that is, braking and drive of motor and generator and at any speed up to the rated speed, with a torque as uniform as possible.

However, practical requirements, especially in cement mill drives, give rise to the problem of producing a torque even at rest, which must cancel out a countertorque. This cannot be achieved with the previously described pulse generators.

To avoid these drawbacks, it is proposed according to the invention to employ for adjusting the output voltage of the frequency changer per phase at least one AC generator as pulse generator which runs synchronously with the motor and has a device which maintains constant the amplitude of its output voltage independently of the speed, and to provide multiplying elements by means of which the amplitudes and phases or frequencies of the values preset by a generator which is commonly referred to as a scanner can be varied. The scanner has the function of producing sinusoidal voltage outputs which are representative respectively of the instantaneous positions of the winding axis of the rotor relative to the winding axis of each phase of the stator. The device thus constitutes a reference value generator, which forms the reference value necessary for regulation and control from the scanner voltage.

The advantage accruing from this is, that a voltage can be obtained as a timing or controlling element down to the lowest frequencies. This will be a DC voltage when the machine is at rest, and, when the machine rotates, a voltage with a frequency corresponding to the speed, taking into account the number of poles. This method can be applied to both synchronous and asynchronous motors.

In synchronous motors, the output to be absorbed will be determined by the phase relation between the magnetic fluxes of the rotor. The rotor flux is generated in the known manner by DC excitation, and the exciter current can likewise be fed in through rectifiers. The armature reaction flux arising owing to the stator current must have a certain phase displacement relative to this flux, which phase displacement determines the absorbed output. It is then generally desirable to give this current as far as possible a direction such, that the power factor becomes practically unity.

This is illustrated by the diagram of FIG. 1. Here, $\phi_e$ indicates the excitation field of the rotor. The flux in the stator is designated by $\phi_1$, and is composed of the exciter flux $\phi_e$ and the armature recitation flux $\phi_i$. The vector of the electromotive force $E_1$ extends perpendicularly to this flux vector, and together with the ohmic resistance of the machine $R_1$ gives the terminal voltage $U_{K1}$. When $U_{K1}$ and $\phi_1$ are in phase, this means that the power factor is at unity. When this is the case, the flux $\phi_i$ should be perpendicular to $\phi_1$ independently of the intensity of the current $I_1$. When the current is zero, the angle $\alpha$ will be 90°, since $\phi_e$ and $\phi_i$ coincide. The angle $\alpha$ becomes progressively smaller as the alternating current increases. It must therefore be taken into account in the control or regulation of the machine. This demands the provision for the scanner two voltages of 0° and 90° per phase, adjustable by means of multiplying elements which must be so composed in an appropriate manner and in accordance with their magnitude that the desired phase angle $\alpha$ is formed. Accordingly, the control of the multiplying elements in the reference value generator must be provisioned for these two values.

In asynchronous machines, the control of the load is not effected by way of the phase angle, but through the slip. Consequently these machines require the provision of a device which would adjust the multiplier in dependence of the slip.

The invention will now be explained with reference to the accompanying drawings, in particular to FIGS. 2 to 9, which illustrate the invention but in no restrictive sense.

FIG. 1 is a vector diagram showing the relationship between the excitation field of the rotor, stator flux, exciter flux, armature reaction flux, electromotive force and terminal voltage of synchronous motors;

FIG. 2 is a diagrammatic view of the installation as a whole to be provided for synchronous motors;

FIG. 3 is a diagram of the arrangement in the case of asynchronous motors;

FIG. 4 illustrates the scanner;

FIG. 8 illustrates the circuitry of the electronic multipliers; and

Figure 5:
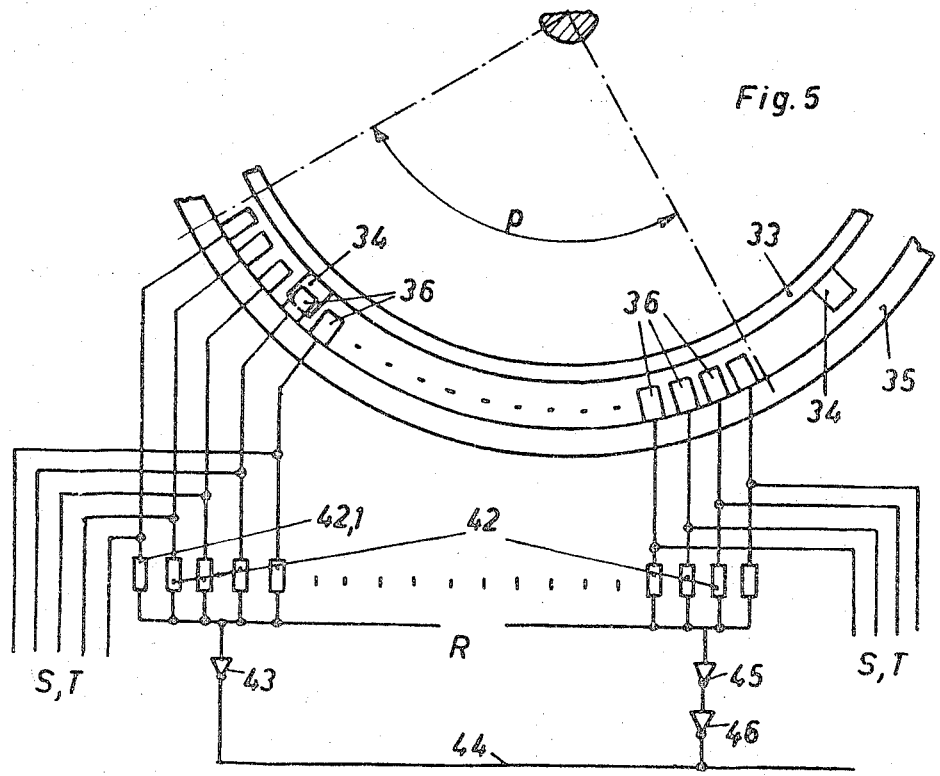
FIG. 5 illustrates another possible form of embodiment of the scanner.

FIG. 9 the mode of functioning of said multipliers.

FIG. 2 shows the control system as a whole for synchronous motors. The synchronous motor 2 is supplied with current from the alternating current mains RST via the frequency changer arrangement 1. The excitation of the motor is symbolized by its field coil. The frequency changers are controlled through the control set 3. The control is shown in detail for the phase R. The control voltage for the control set 3 is generated in the multipliers 4 and 5, which adjust the two sine voltages, displaced by 90° relative to each other, which are produced in the scanner 6. The two component voltages are brought together in the mixer 48. Depending on the magnitude of the two components, there is obtained a resultant voltage of a specific amplitude and phase, which constitutes the reference value for the motor current or the motor voltage. The setting of the multipliers must be such, that the required voltage comes to act on the motors. To this effect, the multipliers are adjusted by the output voltage of two further multipliers 7 and 8. The magnitude of these two DC voltages is in turn predetermined by the function generators 9 and inverters The latter provide the associated cos $\alpha$ and sin $\alpha$ functions, in dependence of the angle $\alpha$ formed by the exciter current $\phi_e$ and the armature reaction flux $\phi_i$ (FIG. 1). The value of $\alpha$ is obtained in the function generator 11, which simulates the dependence of the angle $\alpha$ of the current $I_1$ (or of the flux $\phi_i$ proportional thereto), shown in FIG. 1. This current $I_1$ is fed in as current-proportional voltage. the voltages obtained from the function generators 9 and 10 then vary the current $I_1$ to be preset in the multipliers 7 and 8 in such a manner, that the sine voltages formed in the scanner 6 are given a certain amplitude and are combined to form the control voltage for the control set 3, which then forms therefrom in the known manner the ignition pulses for the inverter or frequency-changer arrangement. For regulating purposes, the output of the multipliers 4 and 5 further receives the instantaneous value obtained from the current transformer 47, so that the control set 3 receives the difference between the index value and the actual value.

FIG. 3 shows the corresponding arrangement for feeding asynchronous motors. It differs from the preceding one in particular therein, that not the angle $\alpha$, but rather the required slip frequency $f_s$ must be predetermined. If the resulting flux in the machine is to retain its rated value, then a specific relationship between slip frequency and current will prevail. Accordingly, the function generator 11 is replaced by a function generator 12, which simulates this relationship. The multipliers 7 and 8 will then receive the voltage of frequency $f_s$, in particular the multiplier 7 will receive via phase changer 13 the voltage displaced by 90°, and the multiplier 8 the voltage without additional phase displacement. There will then be obtained a slip frequency with steadily increasing angle $\alpha$. Thus, the multiplier 7 and 8 will be adjusted synchronously with the slip frequency. This will have the same effect as a steady increase of the angle $\alpha$ (see FIG. 1). As a result, the frequencies of the scanner and the frequency of the multiplier, i.e. the slip frequency, will be superimposed. The frequency changers will then be controlled by a frequency increased or diminished by the value of the slip frequency. In this manner, the arrangement as a whole will operate as an electronic differential.

The scanner 6, which has the particular feature of producing voltages of equal frequency corresponding to the motor speed while maintaining constant the magnitude of the voltage, may be constructed in the manner shown in FIG. 4. The scanner simulates the motor. The rotor element of the scanner is constituted by a permanent magnet 14, which rotates synchronously with the motor. The stator is constituted by Hall probes 15—20, whose voltage depends only on the control current passing therethrough and of the flux between rotor and stator. Two such probes are provided for each phase, which on rotation of the armature 14 generate two voltages displaced by 90°. The scanner produces a voltage proportional to the flux. When the armature is at rest, a direct flux is produced; when it moves, the voltage will vary with the flux passing therethrough, i.e. sinusoidally, with the frequency corresponding to the speed of rotation of the armature. For low speeds, the motor and scanner will be of multiple-pole construction, so that the frequency will appear as a pole-pair multiple of the speed.

It suffices to provide Hall generators for only one phase position per phase, when the voltages thus obtained are converted with the aid of 90°circuits. This arrangement is not shown in detail, since circuits of this kind are known per se.

Figure 6:
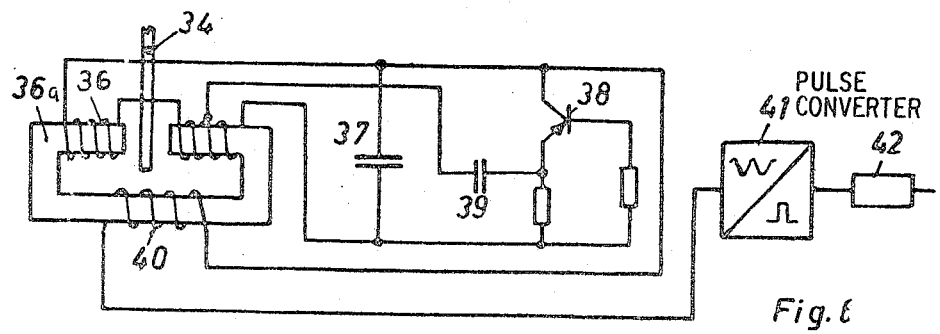
FIG. 6 is the circuit corresponding to the embodiment of FIG. 5.

FIG. 5 shows a different form of embodiment of the scanner. This embodiment offers the advantage, that no separate machine needs to be fitted to the motor shaft. This device can be easily fitted directly to the stator and rotor to one side of the motor. A ring 33 may be fitted to the rotor. This ring has several aluminum fins 34, set off relative to each other by the value of a pole division p. The stator likewise carries a ring 35, on which coils 36 are arranged in closely spaced sequence. These coils may also be arranged distributed over several pole divisions. They are shown in greater detail on FIG. 6. It is seen that they have an iron core 36a with an air gap traversed by the fin 34. This fin, which is made of an electrically conducting material, acts during the passage through the air gap as a short circuit winding of the coil 36. The latter is part of an oscillating circuit for an oscillator. The oscillating circuit consists of the coil 36 and the capacitor 37. The oscillator is formed by the transistor 38, the reaction capacitor 38 and the winding 40 on core 36a. At the output of the winding 40 there appears a voltage whose frequency is determined by the oscillating circuit. As long as an oscillation exists, the impulse converter 41 is blocked. However, as soon as the aluminum fin 34 passes through the air gap, the oscillating circuit is interrupted, the oscillation collapses, since the coil 36 owing to the short circuit current, operates practically only in the manner of a resistance. The pulse converter 41 is then unblocked and there is formed a pulse, which is passed on via FIG., resistance 42.

Figure 7:
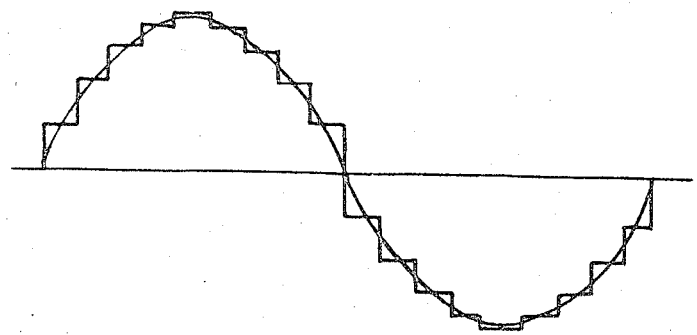
FIG. 7 shows the sinusoidal voltage obtained with the circuit of FIG. 6.

FIG. 5 illustrates the further path of this pulse. In this Figure, a resistance 42 is associated with each oscillating circuit. These resistances are connected to an amplifier 43, which conveys the pulse-generator signal to the line 44. The resistances 42 are variously dimensioned, and their size is so selected, that, commencing with resistance 42.1, it decreases in inverse proportion to a sine function. This produces a sinusoidally increasing current. This is illustrated in FIG. 7. The sine voltage is staircase-shaped, and the steps become smaller as the number of oscillating circuits provided along the stator periphery increases. A full sine curve is produced when the fin 34 passes through a pole division p. The amplifier 43 amplifies this current in the resistances and passes it on as a scanner signal. In order to produce negative values as well, the resistances 42 are combined only for a half-wave each, and connected to the amplifier 43. After passage through zero, the resistance currents are fed to the amplifiers 45 and 46. At the output of amplifier 46 there will then appear a voltage in a direction opposite to that of the voltage appearing on amplifier 43. In this manner, the negative portion of the sine curve will be obtained.

One device of this kind must be provided for each phase. It is shown in greater detail in respect of phase R. However, the phases S and T can be easily obtained by providing resistances fed from the same oscillator, but whose values are so selected, that the first oscillator does not correspond to the passage through zero, but rather to the value of the sine curve at 120°. At phase T, this value will then be 240°. In this manner, three sine curves set off by 120° relative to each other will be obtained, which are fed to the frequency-changer arrangements of the corresponding phases through the multiplier circuits.

FIG. 8 illustrates a multiplier of electronic type, while FIG. 9 shows the mode of functioning of this electronic multiplier. The task in hand is one of steadily reducing the potential $U_e$, which may be of any forms, so that only the voltage $U_a$ will appear at the output of the multiplier. To this end, the voltage is fed to a switching device which, for the sake of greater clarity, is represented by switches. However, these switches may also be reproduced electronically by means of transistors. The control is effected with the aid of the adjustable DC voltage $U_x$ and the constant auxiliary AC voltage $U_H$. The latter has a higher frequency than the input voltage $U_e$. The auxiliary voltage $U_H$ is produced by the generator 25, and is triangular. The DC voltage $U_x$ is fed to the terminal 26. The two voltages are fed through resistances 27 to the comparator 28, where the following processes take place:

As long as the instantaneous value of the auxiliary voltage $U_H$ is smaller than the DC voltage $U_x$, no pulse will appear at the output of the comparator 28. In this case, the switches 21 and 24 remain closed. However, when the instantaneous value of $U_H$ exceeds $U_x$, a pulse is formed. This pulse effects the opening of switches 21 and 24 (i.e. the blocking of the corresponding transistors) and the closing of switches 22 and 23. This reverses the polarity of the input voltage $U_e$. The voltage $U_e$ is conducted through the phase inverter 31 and then passes through the switch 23 to the output or to the resistance 29. The pulse train thus formed on the comparator 28 is referenced by $U_{AC}$ in FIG. 9. The input voltage $U_e$ is assumed to be sinusoidal. The output voltage $U_a$ follows this sine curve as long as the instantaneous value of $U_H$ is smaller than $U_x$, but reverses its polarity when $U_H$ becomes greater than $U_x$. The mean value of this voltage is smaller than that of the input voltage $U_e$. This voltage is then smoothed in the resistance 29 and the capacitor 30, so that an approximately sinusoidal form is produced, which is referenced with $U_{am}$. An increase or decrease of $U_x$ produces a corresponding variation of $U_{am}$. When $U_x$ reaches the amplitude of $U_H$, the whole of the input voltage is allowed to pass through. If $U_x$ is zero, then the voltage $U_a$ will also be zero, since in this case the positive and negative components of the voltage cancel each other. It is then also possible to obtain negative values with this multiplier, so that the input voltage $U_e$ can be controlled in the range of from $-U_e$ through zero to $+U_e$. The negative values are obtained when the voltage $U_x$ is also made negative, so that it intersects the curve $U_H$ on the negative side. In this case, the mean value of the output voltage will become negative in relation to the input voltage.

The input voltage may have any curve shape. It may be a DC or an AC voltage. In case of a DC voltage the multipliers 7 and 8 (FIG. 2) will be used, while in the case of the AC voltage the multipliers 4 and 5 will be made use of.

The function generators will not be described in detail, since their construction is generally known and does not constitute any novel matter. They will be simulated by amplifier arrangements having the required functional dependence.

I claim:

1. In a control circuit for operating a multiphase alternating current motor having a multiphase stator winding fed by alternating and a rotor winding fed by a direct current, an alternating current of amplitude $I_1$ applied to each phase of the stator winding producing a revolving magnetic field vector $\phi_i$ in the strator space and a direct current applied to the rotor winding producing a magnetic field vector $\phi_e$ revolving at the same speed as the magnetic field vector $\phi_i$, said revolving magnetic field vectors coacting with each other to form a resultant magnetic field vector $\phi_1$ and $\alpha$ constituting an angle which when subtracted from 180° defines the angle between the magnetic field vectors $\phi_e$ and $\phi_i$, the combination comprising, a multiphase inverter having its outputs connected respectively to the different phases of stator winding, a control set for controlling the amount of current fed from each phase of said inverter to a corresponding stator winding, a scanner arranged for rotation in synchronism with the rotor of said motor and which produces for each phase of the motor a first sinusoidal output voltage of constant amplitude indicative of the instantaneous position of the motor rotor and a second output voltage similar to said first output voltage but phase displaced from said first output voltage by 90°, a pair of dual input multipliers for each phase of said motor, one input to the multipliers of each pair being constituted respectively by the first and second output voltages of said scanner for the corresponding motor phase, the other input to the multipliers of each pair being constituted respectively by control voltages having amplitudes corresponding to $I_1 \sin \alpha$ and $I_1 \cos \alpha$ for the corresponding motor phase, means for adding the respective outputs from the two said multipliers for each motor phase, and means applying said added outputs to said control set for controlling operation of the corresponding phases of said inverter.

2. A motor control circuit as defined in claim 1 wherein said scanner is constituted by an auxiliary generator driven synchronously with said motor and which includes a rotor of the the permanent magnet type.

3. A motor control circuit as defined in claim 2 wherein said auxiliary generator includes Hall type probes which have a mutual phase displacement of 90°.

4. A motor control circuit as defined in claim 1 wherein said scanner is constituted by a ring secured concentrically on the rotor of the motor, said ring being provided with circumferentially spaced conductive lugs corresponding to the pole spacing of the motor, sets of coils located in curcimferentially spaced relation on the stator of said motor, said coils being components of an oscillator circuit and being provided with iron cores including gaps into and through which said conductive lugs pass as said motor rotor rotates, said oscillator producing an interrupted voltage output at a frequency determined by the oscillator characteristic, a pulse converter connected to the output of the oscillator output is interrupted, and resistances connected to the pulse converter, said resistances having, as a function of the position of the resonant circuits of the oscillator sinusoidally dependent values per pole pitch such that when coupled together, the current flowing through them has a sine curve.

5. A motor control circuit as defined in claim 1 wherein said multiplier is constituted by electric switches, an alternating current generator producing a delta voltage of higher frequency than that of the motor, a direct current voltage source, a comparator for comparing said delta voltage with said direct current voltage, said comparator producing an output voltage pulse when the instantaneous amplitude of said delta voltage exceeds that of said direct current voltage, thereby to actuate said switches.

6. A motor control circuit as defined in claim 5 and which includes a reversing amplifier for applying the input voltage to some of said switches with a negative sign.

7. In a control circuit for operating a multiphase alternating current motor having a multiphase stator winding fed by alternating current and a rotor winding fed by direct current, an alternating current or amplitude $I_1$ applied to each phase of the stator winding producing a revolving magnetic field vector $\phi_i$ in the stator space and a direct current applied to the rotor winding producing a magnetic field vector $\phi_e$ revolving at the same speed as the magnetic field vector $\phi_i$, said revolving magnetic field vectors coacting with each other to form a resultant magnetic field vector $\phi_1$ and $\alpha$ constituting an angle which when subtracted from 180° defines the angle between the magnetic field vectors $\phi_e$ and $\phi_i$, the combination comprising, a multiphase inverter having its outputs connected respectively to the different phases of stator winding, a control set for controlling the amount of current fed from each phase of said inverter to a corresponding stator winding, a scanner arranged for rotation in synchronism with the rotor of said motor and which produces for each phase of the motor a first sinusoidal output voltage of constant amplitude indicative of the instantaneous position of the motor rotor and a second output voltage similar to said first output voltage but phase displaced from said first output voltage by 90°, a pair of dual input multipliers for each phase of said motor, one input to the multipliers of each pair being constituted respectively by the first and second output voltages of said scanner for the corresponding motor phase, the other input to the multipliers of each pair being constituted respectively by control voltages having amplitudes corresponding to $I_1 \cdot$ the slip frequency $f_s$ to be adjusted, means for adding the respective outputs from the two said multipliers for each motor phase, and means applying said added outputs to said control set for controlling operation of the corresponding phases of said inverter.

PO-1050
(5/69)

UNITED STATES PATENT OFFICE
CERTIFICATE OF CORRECTION

Patent No. 3,551,766      Dated December 29, 1970

Inventor(s) Herbert Stemmler

It is certified that error appears in the above-identified patent and that said Letters Patent are hereby corrected as shown below:

Claim 1, line 3, after "nating" the word "current" should be inserted;

Claim 1, line 7, the "g" has been omitted in the word "magnetic";

Claim 4, column 6, line 7, the following has been left out after "output of the oscillator":

-- for forming a pulse each time the oscillator

Claim 7, line 4, reads "or amplitude" which should be

-- of amplitude --

Signed and sealed this 30th day of March 1971.

(SEAL)
Attest:

EDWARD M. FLETCHER, JR.
Attesting Officer

WILLIAM E. SCHUYLER,
Commissioner of Paten